US010030286B1

(12) United States Patent
Xu et al.

(10) Patent No.: US 10,030,286 B1
(45) Date of Patent: Jul. 24, 2018

(54) METHOD OF DIRECT SOLVENT EXTRACTION OF RARE EARTH METALS FROM AN AQUEOUS ACID-LEACHED ORE SLURRY

(71) Applicant: II-VI Incorporated, Saxonburg, PA (US)

(72) Inventors: Wen-Qing Xu, Medfield, MA (US); Elgin E. Eissler, Renfrew, PA (US); Vincent D. Mattera, Jr., Gibsonia, PA (US)

(73) Assignee: II-VI Incorporated, Saxonburg, PA (US)

( * ) Notice: Subject to any disclaimer, the term of this patent is extended or adjusted under 35 U.S.C. 154(b) by 61 days.

(21) Appl. No.: 14/537,194

(22) Filed: Nov. 10, 2014

Related U.S. Application Data

(60) Provisional application No. 61/903,644, filed on Nov. 13, 2013.

(51) Int. Cl.
  *C22B 59/00* (2006.01)
  *C22B 3/26* (2006.01)
  *C22B 3/20* (2006.01)

(52) U.S. Cl.
  CPC ............ *C22B 59/00* (2013.01); *C22B 3/0005* (2013.01); *C22B 3/0097* (2013.01); *C22B 3/20* (2013.01); *C22B 3/205* (2013.01)

(58) Field of Classification Search
  CPC ....... C22B 3/0005–3/0097; C22B 3/20; C22B 3/205; C22B 59/00
  USPC ................... 75/743; 423/21.5, 263
  See application file for complete search history.

(56) References Cited

U.S. PATENT DOCUMENTS

| | | | | |
|---|---|---|---|---|
| 2,860,031 A | * | 11/1958 | Grinstead | B01D 11/028 252/364 |
| 3,159,452 A | * | 12/1964 | Lerner | C22B 60/0291 423/165 |
| 3,524,723 A | * | 8/1970 | Millsap | C01F 17/0006 423/21.5 |
| 3,582,263 A | * | 6/1971 | Chiola | C01F 17/0006 423/21.5 |
| 3,751,553 A | * | 8/1973 | Gaudernack | C01F 17/0006 423/21.5 |
| 3,969,476 A | | 7/1976 | Lucas et al. | |
| 4,041,125 A | | 8/1977 | Alstad et al. | |
| 4,624,703 A | | 11/1986 | Vanderpool et al. | |
| 4,647,438 A | * | 3/1987 | Sabot | C01F 17/0006 423/21.5 |
| 4,718,996 A | | 1/1988 | Vanderpool et al. | |
| 4,751,061 A | | 6/1988 | Kim et al. | |
| 4,808,384 A | | 2/1989 | Vanderpool et al. | |
| 5,015,447 A | | 5/1991 | Fulford et al. | |
| 5,030,424 A | | 7/1991 | Fulford et al. | |
| 5,708,958 A | | 1/1998 | Koma et al. | |
| 6,110,433 A | | 8/2000 | Kleinsorgen et al. | |
| 6,238,566 B1 | | 5/2001 | Yoshida et al. | |
| 7,138,643 B2 | | 11/2006 | Lewis et al. | |
| 7,282,187 B1 | | 10/2007 | Brown et al. | |
| 7,799,294 B2 | | 9/2010 | Kordosky et al. | |
| 7,829,044 B2 | | 11/2010 | Makioka et al. | |
| 8,062,614 B2 | | 11/2011 | Kordosky et al. | |
| 8,177,881 B2 | | 5/2012 | Sugahara et al. | |
| 8,328,900 B2 | | 12/2012 | Bednarski et al. | |
| 9,481,638 B2 | * | 11/2016 | Goto | C22B 3/0005 |
| 2004/0031356 A1 | | 2/2004 | Lorenzo et al. | |
| 2005/0107599 A1 | | 5/2005 | Makioka et al. | |
| 2006/0024224 A1 | | 2/2006 | Neudorf et al. | |
| 2010/0089764 A1 | | 4/2010 | Torres et al. | |
| 2010/0282025 A1 | | 11/2010 | Nisbett | |
| 2012/0160061 A1 | | 6/2012 | Heres et al. | |
| 2013/0283977 A1 | * | 10/2013 | Lakshmanan | C22B 59/00 75/743 |

FOREIGN PATENT DOCUMENTS

| | | | |
|---|---|---|---|
| GB | 862204 | * | 3/1961 |
| WO | 2013/136941 | * | 9/2013 |

OTHER PUBLICATIONS

Ritcey, G., "Development of Industrial Solvent Extraction Processes" in Solvent Extraction Principles and Practice edited by Rydberg, J. et al., 2004, pp. 277-337, second edition, revised and expanded, Marcel Dekker, Inc., New York.

* cited by examiner

*Primary Examiner* — Steven J Bos
(74) *Attorney, Agent, or Firm* — The Webb Law Firm

(57) ABSTRACT

A method of extracting rare metals from ore including: providing an aqueous acid-leached ore slurry; adding an organic extractive solvent to the aqueous acid-leached ore slurry; mixing an organic extractive solvent with the aqueous acid-leached ore slurry to form a mixture; and separating the mixture into at least an aqueous phase and a solvent phase. The aqueous acid-leached ore slurry may have a viscosity of less than 400 centipoise, a Newtonian or near Newtonian rheology, and a pH of less than 4.0. The organic extractive solvent may comprise an extractant, a solvent, and a modifier. Separation of the aqueous acid-leached ore slurry/organic extractive solvent mixture may result in an emulsion phase, a crud, or both in addition to the aqueous phase and the solvent phase. The emulsion phase, the crud or both may be further treated by adding a low-carbon-number alcohol.

20 Claims, No Drawings

METHOD OF DIRECT SOLVENT EXTRACTION OF RARE EARTH METALS FROM AN AQUEOUS ACID-LEACHED ORE SLURRY

CROSS-REFERENCE TO RELATED APPLICATION

This application claims priority to U.S. Provisional Application Ser. No. 61/903,644, filed Nov. 13, 2013, which is hereby incorporated by reference in its entirety.

BACKGROUND OF THE INVENTION

Field of the Invention

The present invention relates to a method of extracting rare earth metals from ore and from emulsion and crud resulting from the extraction of rare earth metals from ore. More specifically, the invention is directed to a method of direct solvent extraction of rare earth metals from an aqueous acid leached ore slurry and a method of treating emulsion and crud resulting from the extraction of rare earth metals from ore to further recover the rare earth metals contained therein.

Description of Related Art

Solvent extraction is widely used for recovering valuable metals that are dissolved in an aqueous solution, U.S. Pat. Nos. 4,041,125; 4,624,703; 4,718,996; 4,751,061; 4,808,384; 5,015,447; 5,030,424; 5,708,958; 6,110,433; 6,238,566; 7,138,643; 7,282,187; 7,799,294; 7,829,044; 8,062,614; 8,177,881; 8,328,900 and United States Patent Application Publication Nos. 2004/0031356; 2005/0107599; 2006/0024224; 2010/0089764; 2010/0282025; and 2012/0160061. The valuable metals are typically acid-leached into the aqueous solution from ores and/or other feedstock and a clear aqueous solution containing valuable metals is separated from the acid-leached ore slurry by filtration and washing. The solvent extraction is then performed on the clear aqueous solution.

The feedstock may include different rare earth metal containing ores and minerals, as well as titania tailing, uranium ore tailing, red mud that is typically generated from aluminum Bauxite-Bayer and sintering process, and other such materials. In addition, the ore and/or feedstock that contain these valuable metals may be pre-processed for the purpose of achieving threshold leachability and commercial viability. Such processing may include particle-size reduction or shape change, hydrothermal treatments involving hydrothermal reactions, high-temperature treatments involving solid phase reactions, meta-glassy-phase high temperature reactions, complete melting high temperature liquid phase reactions, etc.

In the solvent extraction process, an organic liquid or solvent phase containing extractant(s) that can chemically react with a valuable metal or multiple valuable metals is well mixed with the aqueous solution that contains such valuable metal ion(s). The valuable metal ion or multiple valuable metal ions are then transferred into the organic phase of the extractive organic solvent during mixing. Intensive mixing ensures a complete transfer of the valuable metal ion(s) from aqueous phase to organic phase. After mass transfer of valuable metal(s) from the aqueous phase to the organic phase, the process typically undergoes a phase separation via gravitational settling or a high-g centrifugal phase separation mechanism, such as a centrifuge.

Industrially, a continuous process using a combination of (1) mixing an organic extractive solvent and an aqueous solution containing valuable metal(s) and (2) settling the mixture of such aqueous and organic phases for phase separation by gravity is called a mixer and settler process. Such a mixing and settling process can also be achieved with a batch process in a batch mixing tank in a manufacturing plant or in a beaker equipped with a magnetic or a mechanical mixer in a chemical lab. The separated organic phase is the desirable product that contains the valuable metals. The separated aqueous phase is called a raffinate which, ideally, contains minimum amounts of the targeted valuable metal(s). When mixing the aqueous solution and the organic extractive solvent, intensive mixing can lead to emulsions, oil-in-water or water-in-oil. In the event of forming emulsions, the phase separation process may need to be extended to a level that is not economically feasible. In some cases, the formed emulsions might be stable enough such that economical phase separation is impossible, and, in other cases, phase separation may be incomplete, which results in a loss of valuable organic solvent and valuable metals contained in the lost organic solvent.

The process of obtaining a clear aqueous solution containing water-soluble valuable metal(s) by separating it from acid-leached ore slurries via filtration and washing may also result in low yield recovery of the valuable metal(s) and/or generation of a large volume of aqueous solution that contains low concentrations of valuable metal(s). Washing with insufficient amounts of water leads to a loss of significant amounts of residual valuable metal(s) that are still physically trapped in the residues of the filter cakes. In practical processes, a complete recovery of the valuable metals from the acid-leached ore slurries could never be achieved even if unlimited amounts of water could be used for thorough washing since partial amounts of the valuable metal ions are chemically bonded to the ion-exchangeable sites of the residues. And, even though thorough washing with unlimited amounts of water could theoretically reach a level of near complete recovery of the valuable metal(s) from the acid-leached ore slurries, thorough washing with unlimited water is impractical since it requires a downstream process (solvent extraction in this case) to process a huge volume of aqueous solutions that contain low concentrations of valuable metal(s). Use of such unlimited amounts of water also leads to issues related to the costs involved with disposing of such a huge volume of waste raffinate, not to mention the usage of a huge volume of fresh water resources.

In addition, in the prior art, direct solvent extraction of valuable metal(s) from a leached slurry in mixing tanks has not been practiced industrially due to issues of crud formation and emulsion formation. Crud formation occurs when, during the contact of the organic extractive solvent and the acid-leached ore slurries, some inorganic particles are bonded to the extractant molecules chemically and undesirably transferred into the organic phase along with the desirable mass transfer of the valuable metal ion(s) from the aqueous phase to the organic phase. Crud is defined in the art as the material resulting from the agitation of an organic phase, an aqueous phase, and fine solid particles to form a stable mixture (Gordon M. Ritcey, "Development of Industrial Solvent Extraction Processes" in the book *Solvent Extraction Principles and Practices*, second edition, revised and expanded, edited by Jan Rydberg, Michael Cox, Glaude Musikas, and Gregory R. Choppin and published by Marcel Dekker, Inc., pg. 313, 2004). Emulsions are classified into two different forms, oil-in-water and water-in-oil, both of which are typically formed under intense mixing conditions due to the formation of oil droplets in water or water droplets in oil. The droplet size of such newly formed emulsions decreases with the level of mixing. Intense mixing conditions lead to emulsions with smaller droplet sizes. The smaller droplets are more difficult to coagulate to form a continuous aqueous phase and a continuous organic phase. Therefore, emulsions of small droplets are stable, which then results in difficulties in phase separation. However, intensive mixing is critical to keep ore particles contained in the leached slurry suspended. Therefore, direct solvent extraction of valuable metal(s) from leached suspended-particle-containing ore slurries needs to be performed under intense mixing conditions, resulting in formation of substantial emulsions, either in the form of water-in-oil or oil-in-water. This creates a practical dilemma that prevents successful implementation of direct solvent extraction of valuable metal(s) from leached ore slurries in a continuous mixer and settler process or in a batch tank process.

Lucas and Ritcey, inventors of U.S. Pat. No. 3,969,476, disclose a sieve-in-plate pulse column process, called the "solvent-in-pulp" process, in which soluble valuable metal(s) is extracted from ore slurries. Lucas and Ritcey also realize that up to the time of their patent disclosure, no process had run successfully on a plant scale for the recovery of valuable metal(s) directly from leached ore slurries. They also state that early work on mixer-settlers proved unsatisfactory because the excessive agitation caused stable emulsions and crud formation with amines (the extractant used in Lucas and Ritcey's disclosure). Even now, the common wisdom is that direct solvent extraction of valuable metal(s) from leached ore slurries in a mixer-settler process or a batch tank process cannot properly operate practically due to the excessive formation of crud and emulsions which form in a continuous mixer-settler process and a batch-type mixing tank because the intensity of the mixing has to be strong enough to keep the acid-leached ore slurries suspended.

Even though Lucas and Ritcey's disclosure claims preliminary success in direct solvent extraction of valuable metal(s) from the leached ore slurries by using a sieve-in-plate pulse column process, the sieve-in-plate pulse column process still suffers critical limitations. One of the limitations is that any leached ore slurry has a very broad particle size distribution. Large particles may not be well-suspended and may plug the sieve holes of the column plates. Small particles might flocculate to form large particle agglomerates due to a lack of shear in the column and these large agglomerated particles might also plug the sieve holes of the column plates. Excessive sieve hole plugging by large particles normally accelerates with the time on stream to a point where the column has to be completely dissembled for cleaning, which is costly and tedious. The aforementioned limitations likely have led to no actual industrial adaptation of direct solvent extraction of valuable metal(s) from leached ore slurries using the sieve-in-plate pulse column process disclosed by Lucas and Ritcey more than three decades ago. Thus, current industrial standard practices still use organic solvents containing extractant(s) to extract valuable metals from clear aqueous solutions that are produced by filtering and washing the leached ore slurries.

After the issuance of U.S. Pat. No. 3,969,476, one of its inventors, Gordon M. Ritcey, published his articles "Development of Industrial Solvent Extraction Processes" in the book "Solvent Extraction Principles and Practices", second edition, revised and expanded, edited by Jan Rydberg, Michael Cox, Glaude Musikas, and Gregory R. Choppin and published by Marcel Dekker, Inc., in 2004, and states on page 313 that "solids must be absent from most solvent extraction circuits and clarification is usually aimed at achieving about 10 ppm of the solids", which is 0.001% solids contents of the aqueous solution. In direct solvent extraction on the other hand, solids content of acid-leached ore slurries may be three to five magnitudes higher, from a few percent to as high as 50-70%.

Another limitation of Lucas and Ritcey's method is that the extractant molecules in the organic extractive solvent are of the amine type. Organic extractive solvents of the amine type are typically cationic and react with and bond to the anionic surface sites of silicate/silica-related residues in the ore slurry. Such bonding of the amine type extractive molecules in the organic extractive solvent to the anionic surface sites of the silica/silicate-related residues leads to a significant loss of the organic extractive solvent. Therefore, Lucas and Ritcey's process requires a pretreatment with organic non-ionic hydrophilic materials which are adsorbed by the gangue solids for the purposes of decreasing the affinity of the gangue solids for the amine.

SUMMARY OF THE INVENTION

The present invention is directed to a method of extracting rare earth metals from ore comprising: providing an aqueous acid-leached ore slurry having at least 0.1 percent solids; adding an organic extractive solvent to the aqueous acid-leached ore slurry; mixing an organic extractive solvent with the aqueous acid-leached ore slurry to form a mixture; and separating the mixture into at least an aqueous phase and a solvent phase.

The aqueous acid-leached ore slurry may have a viscosity of less than 400 centipoise and preferably less than 100 centipoise, a Newtonian or near Newtonian rheology, and a pH of less than 4.0. In addition, the aqueous acid-leached ore slurry may be treated to convert ferric iron ions to ferrous iron ions prior to adding the organic extractive solvent.

The organic extractive solvent comprises an extractant, a solvent, and a modifier. The extractant may be anionic or non-ionic, may comprise phosphorous-containing molecules, and may be Di-(2-ethylhexyl)-phosphoric acid or tri-butyl phosphate. The solvent may comprise a hydrocarbon or mixture of hydrocarbons having a boiling point that is 100° C. or greater and may be kerosene or diesel. The modifier may be isodecanol, coconut alcohol, octanol, ethylhexyl alcohol, or any other alcohol containing six or more carbon atoms. The organic extractive solvent may comprise 0.01-80% extractant, 20-99.99% solvent, and, optionally 0-30% modifier.

The mixing may comprise mixing for at least 3 seconds followed by turning off the mixing to allow the mixture to rest for at least two seconds and, optionally, repeating the mixing-resting cycle two or more times. The mixing may be carried out at a temperature less than the boiling point of the organic extractive solvent and, preferably, less than or equal to 100° C.

Separation of the aqueous acid-leached ore slurry/organic extractive solvent mixture may result in an emulsion phase, crud, or both in addition to the aqueous phase and the solvent phase. The emulsion phase, the crud or both may be further treated by: adding a low-carbon-number alcohol to the emulsion phase, the crud, or both; mixing the alcohol with the emulsion phase, the crud, or both to form a mixture; and separating the resulting mixture into an organic liquid fraction, an aqueous slurry faction, and an aqueous-organicparticle slurry fraction. Optionally, the aqueous-organic-particle slurry fraction may be separated into a liquid fraction and filter cakes by filtration or centrifuge and/or the aqueous phase may be added to the aqueous phase that resulted from the separation of the aqueous acid-leached ore slurry/organic extractive solvent mixture and the solvent phase may be added to the solvent phase that resulted from the separation of the aqueous acid-leached ore slurry mixture/organic extractive solvent. The low-carbon-number alcohol may comprise methanol, ethanol, n-propanol and isopropyl alcohol, n-butanol and its isomers, n-pentanol and its isomers, n-hexanol and its isomers, heptanol and its isomers, octanol and its isomers, nonanol and its isomers, or mixtures of one or more of these alcohols and may be added to the emulsion phase, the crud, or both at 0.01 to 50%.

The method of treating the emulsion, crud, or a combination thereof may be further utilized on emulsion, crud, or a combination thereof that may be created during extraction of rare earth metals from ore using methods other than the one described herein or from a clear solution containing rare earth metals.

DESCRIPTION OF THE INVENTION

The direct solvent extraction of rare earth metals, including scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu) according to present invention may be carried out in batch mixing tanks or continuously.

Aqueous acid-leached ore slurry containing one or more rare earth metals are introduced into a mixing tank. An organic extractive solvent is added to aqueous acid-leached ore slurry comprising at least 0.1 percent solids and the combination is thoroughly mixed. The mixture is then separated into at least an aqueous phase and an organic phase wherein the solvent phase contains at least 50% of at least one of the rare earth metals that were originally present in the slurry.

The feedstock for the slurry is any ore or mineral that contains rare earth metals even in trace amounts as low as 100 ppm or lower. Feedstock materials include, but not limited to, rare earth containing minerals such as thorteveitite, bastnasite, monazite, xenotime, Allanite, apatite, brannerite, eudialyte, euxenite, Fergusonite, Florencite, gadolinite, laparite, perovskite, pyrochlore, zircon, Wolframite, bazzite, Kolbeckite, jervisite, cascandite, juonnite, pretulite, scandiobingtonite, and Kristiansenite, red mud, titanium tailing, uranium tailing, and cobalt and nickel minerals, such as laterites. The feedstock is ground into a fine particulate and mixed with water and at least one suitable acid for dissolving metals in the ore. Suitable acids include, but are not limited to mineral acids including sulfuric acid, hydrochloric acid, and nitric acid. The leaching takes place at a temperature of the boiling point of water, 100° C. or below, and, preferably, at 60-100° C. while the solution is thoroughly mixed, for example, at 145-150 rpm.

The aqueous acid-leached ore slurry may have viscosity of less than 400 centipoise, preferably a viscosity of less than 100 centipoise, and more preferably a viscosity of less than 20 centipoise, while the low limit of the viscosity is similar to the viscosity of water (about 0.3 centipoise at 100° C. and 1 centipoise at 20° C.). During the intermixing of the organic extractive solvent and aqueous acid-leached ore slurry, both the organic extractive solvent and aqueous acid-leached ore slurry are broken into liquid globular droplets. Aqueous acid-leached slurries of low viscosity allow, after mixing is stopped, quick and near complete coagulations of these globular droplets of organic and aqueous phases into two continuous phases, an organic phase and an aqueous slurry phase. Direct solvent extraction of rare earth metal from aqueous acid-leached ore slurries of high viscosity drastically slows down, or even completely prevents the globular droplet coagulation from happening, which results in the formation of undesirable stable emulsions.

Preferably the aqueous acid-leached ore slurry has a Newtonian (or near Newtonian) rheology. Aqueous acid-leached ore slurries having Newtonian rheology, or near Newtonian rheology, allow, after mixing is stopped, quick and near complete coagulation of these globular droplets of organic and aqueous phase into two continuous phases, an organic phase and an aqueous slurry phase. Thixotropic rheological behaviors of the leached ore slurries drastically slow down, or even completely prevent the globular droplet coagulation from happening, which results in the formation of stable emulsions.

The pH of the aqueous acid-leached ore slurry is sufficient to prevent partial or complete precipitation of the rare earth metals. If the acid-leached ore slurry pH reaches a level at which the rare earth metals precipitate onto the surfaces of the particles of the acid-leached ore slurry, the extractant molecules in the organic extractive solvent chemically bond onto the particle surfaces, which results in the undesirable transfer of inorganic particles into the organic phase resulting in the formation of crud. The pH of the aqueous acid-leached ore slurry, therefore, is less than 4.0 (or proton concentration [H+] is less than $1 \times 10^{-4}$ M), while the proton concentration [H$^+$] may be as high as 5 to 10 M (or pH as low as −1].

Aqueous acid-leached ore slurries that contain iron in the form of ferric ions and/or ferrous ions are preferred. Feedstock such as red mud, titanium tailing, uranium tailing, cobalt and nickel minerals and other such rare earth containing ores or minerals may also contain a certain level of iron, and sometimes, iron may even be a major component of the feedstock, such as red mud from aluminum Bauxite-Bayer and sintering process. During the acid-leaching process, iron is dissolved by the mineral acid to form ferric ions, which compete with the rare earth metal ions for the extractant molecules in the organic extractive solvent. Therefore, the ferric ions may be chemically reduced to ferrous ions prior to adding the organic extractive solvent. This may be accomplished using hydroxylamine chloride or any other suitable reducing agent.

Reduction of ferric ions by hydroxylamine results in a decrease in the slurry pH, due to formation of an extra mole of hydrochloric acid for every mole of ferric ions that is reduced to ferrous ions. Therefore, it may be necessary to readjust the pH after treatment. Such adjustment may be accomplished using sodium hydroxide or another suitable base.

Preferably, the aqueous acid-leached ore slurry has not undergone any pretreatment with organic non-ionic hydrophilic materials which are adsorbed by the gangue solids and decrease the affinity of the gangue solids for amines as disclosed in U.S. Pat. No. 3,969,476.

The organic extractive solvent contains an extractant, a solvent, and, optionally, a modifier and is added to the slurry at a concentration of 1-99%, depending on the amount of rare earth metals in the slurry and may be around 20-80%.

The extractant is anionic or non-ionic. An anionic and/or non-ionic extractant is not chemically active for bonding with the anionic surface sites of the silica/silicate-containing residues in the aqueous acid-leached ore slurry. Preferably, phosphorus-containing molecules are used as the extractant, anionic and/or non-ionic. More preferably, DEHPA, Di-(2-ethylhexyl)-phosphoric acid, or tri-butyl phosphate are used as the extractant in the organic extractive solvent.

The solvent comprises a hydrocarbon or a mixture of hydrocarbons having a boiling point that is greater than or equal to 100° C. including but not limited to kerosene or diesel.

The optional modifier may be isodecanol, coconut alcohol, octanol, ethylhexyl alcohol and alcohol(s) containing six or more carbons.

The organic extractive solvent contains 0.01-80% extractant, 20-99.9% solvent, and, optionally, 0-30% modifier. If too much extractant is used, the organic phase has a high viscosity which affects the separation of phases. If too little extractant is used, the process is not economically favorable.

The aqueous acid-leached ore slurry and the organic extractive solvent are mixed until sufficient transfer of rare earth metals into the organic phase is achieved to make the process economically feasible. Mixing may be accomplished by recirculation using a pump, by stirring using an impeller or any other suitable means that allows for thorough mixing. Mixing may be at full speed or reduced speed for at least 3 seconds, followed by turning off the mixing for at least 2 seconds to allow the organic and aqueous phase droplets to coagulate and then, optionally, the mixing may be repeated. Preferably, 2 or more cycles of mixing and settling are performed. Mixing is preferably at 144-152 rpm if an impeller-type mixer is used. The mixing speed may vary depending on the type and size of the mixer.

For aqueous acid-leached ore slurries of low viscosity (<400 centipoise), the direct solvent extraction of the rare earth metals may be carried out at room temperature. However, it is preferred that the extraction process is carried out at elevated temperatures at which the probability of forming emulsions is reduced and the chelating reaction between the extractant and rare earth metal ions occurs more quickly and completely. It is also more economical to carry out the extraction at elevated temperatures so the aqueous acid-leached ore slurry does not have to be cooled prior to adding the organic extractive solvent, thus saving energy and time. Therefore, the extraction is carried out at a temperature less than the boiling temperature of the organic extractive solvent and, preferably, less than or equal to 100° C. and, more preferably, at a temperature between 0° C. to 80° C.

Separation of the phases may be accomplished by gravitational settling or a high-g centrifugal phase separation mechanism, such as a centrifuge.

An emulsion phase and/or crud may also be formed and may comprise up to 40% of the volume of organic extractant solvent used. If an emulsion phase and/or crud forms, the process may further comprise the addition of a low-carbon-number alcohol to the emulsion phase and/or the crud followed by mixing. The resulting mixture is separated into an organic liquid fraction, an aqueous slurry fraction, and a fraction of aqueous-organic-particle slurry by gravitational phase separation, filtering, centrifuging or a combination thereof. Optionally, the aqueous-organic-particle slurry is separated into another liquid faction and filter cakes. The liquid consists of additional clear organic phase containing rare earth metals and an aqueous phase which is waste, and the liter cakes of the aqueous-organic-particle slurry will contain very small amounts of residual rare earth metals that can be cycled back to the upstream processes for their further recovery or for safe waste disposal. The organic phase can be added to the organic phase obtained from the original mixing of the aqueous acid-leached ore slurry and the organic extractive solvent.

The low-carbon-number alcohol breaks the emulsion and/or the crud which can then be filtered. Such low-carbon-number alcohols include, but are not limited to, methanol, ethanol, n-propanol and isopropyl alcohol, n-butanol and its isomers, n-pentanol and its isomers, n-hexanol and its isomers, heptanol and its isomers, octanol and its isomers, nonanol and its isomers, and/or mixtures of one or more of these alcohols with other chemical compounds. Between 0.01% and 5% of the low-carbon-number alcohol is added to the emulsion phase and/or crud.

Mixing may occur at room temperature and may be accomplished by hand mixing, recirculation using a pump, stirring using an impellor, or any other suitable means or any combination of means that allows for thorough mixing. Mixing may be performed at room temperature.

After mixing, broken emulsion and/or crud are separated into an organic liquid fraction, an aqueous slurry faction, and a fraction of aqueous-organic-particle slurry using gravitational phase separation or any other suitable means, or a combination thereof and the aqueous-organic-particle slurry may further be separated into a liquid fraction and filter cakes by filtration or centrifugation. The liquid fraction is then separated into an aqueous waste phase and an organic phase containing the rare earth metals.

The following examples are illustrative of the process.

Comparative Example

Acid-leached ore slurries containing valuable metals, in this case, scandium and other rare earth metals, which may be completely water-soluble or may be chemically bonded to ion-exchangeable sites of inorganic residues in the feedstock, are typically produced in 7000-liter fiber glass-reinforced plastic (FRP) reactors, according to the general disclosures in references 1-27. The feedstock, the water, and the acid, in this case, hydrochloric acid, are mixed at 144 rpm with 12" triple blades that pump the slurry downwards at a temperature of 80-100° C. Such leaching slurries have a typical pH of 0.5. In the prior art extraction process, the aqueous acid-leached slurry undergoes a normal solid-liquid separation process, filtration, to produce a liquid filtrate which contains the rare earth metals and solid filter cakes of leaching residues, which are generally waste material. The filter cakes of the leaching residues are typically washed by fresh water in a volume that is equivalent to one volume of the filter press volume. The filtrate stream and washing stream are then combined into a product stream. Additional washing with fresh water in a volume that is equivalent to four volumes of the filtered press leads to formation of very large amounts of the washing filtrate that has such low concentrations of rare earth metals that is not economically viable. Even with a thorough washing with fresh water in a volume that is equivalent to five time volumes of the volume of the filter press, there are still substantial amounts of rare earth metals left, as free metal ions trapped inside the filter cakes or bonded to the ion-exchangeable sites of the leaching residues. Therefore, the conventional process of acid-leaching followed by filtration and washing, in the present manufacturing process, only recovers 60% to 80% of the rare earth metals. In addition to filtering and washing, solvent extraction of the filtrate is needed to recover the rare earth metal.

Examples 1-3: Direct Solvent Extraction of Scandium from an Aqueous Acid-Leached Ore Slurry, in which Ferric Ions were Reduced to Ferrous Ions

Example 1

In a 7000-liter FRP reactor, the scandium-containing aqueous acid-leached ore slurry was prepared in the same way as the Comparative Example, with a slurry volume (about 3803 liters) similar to that of the Comparative Example. The slurry had a pH of about 0.5 and contained a concentration of 1727 ppm scandium. The slurry was mixed with 67 kg of hydroxylamine chloride which was slowly added into the slurry to reduce ferric ions ($Fe^{3+}$) into ferrous ions ($Fe^{2+}$) at 80-100° C. for one hour. The leached ore slurry changed from a reddish muddy color to a greenish color. Reduction of ferric ions by the hydroxylamine resulted in a decrease in the slurry pH due to the formation of an extra mole of hydrochloric acid for every mole of ferric ions that were reduced. Therefore, after the iron-reduced slurry was cooled to a temperature of about 60° C., the pH was adjusted back to 0.5 with a 20 wt. % sodium hydroxide solution.

While the mixer was off, 1800 liters of organic extractive solvent was pumped into the reactor by dropping from the top onto the surface of the iron-reduced acid-leached ore slurry. The fresh solvent contained about 20% DEHPA (Di-(2-ethylhexyl)phosphoric acid), 5% isodecanol, and 75% kerosene and it floated on the top of the iron-reduced acid-leached slurry.

The mixer was equipped with a variable-frequency drive, up to 60 hertz, for the purposes of controlling the mixing speed. The mixing was started at a reduced speed by setting the variable-frequency at 20 hertz and run for 2 minutes. No significant movement of the organic phase was observed; therefore, the mixing speed was increased in increments of 5 hertz every 2 minutes. When reaching a level of 40 hertz, some subtle movement of the organic was observed. At 45 hertz, some greenish clouds of the aqueous slurry were thrown into the organic phase. When reaching 60 hertz, more greenish cloud was observed being thrown into the organic phase. However, there was no observation of any vortex in the organic phase. The mixer ran at 60 hertz for about 20 more minutes with a mixing speed of about 144 to 152 rpm. At the end of the last 20 minutes of mixing at 60 hertz, a sample (about 1000 mL) was taken while the mixer was still on in order to assure that the sample was homogeneous and representative. Then, the mixer was turned off to allow for the organic-aqueous phase separation.

The sample was transferred into a one-liter separatory funnel for organic-aqueous phase separation. Then the raffinate of exhausted aqueous slurry (aqueous phase) was digested with a concentrated HCl solution at temperatures between 80-100° C. The digested slurry was filtered with a Whatman 42 filter paper and washed thoroughly with distilled water. The filtrate was analyzed using inductively coupled plasma spectroscopy (ICP) and the scandium concentration of the raffinate slurry was determined to be 6.0 ppm Scandium, as shown in Table 1. Thus, a 99.6% scandium extraction yield was achieved, i.e., 99.6% of the scandium was transferred from the aqueous phase of the acid-leached ore slurry to the organic phase.

TABLE 1

Results of the Analysis of the Raffinate Slurry from Example 1

| Extraction Time | Sc, ppm | Y, ppm | La, ppm | Ce, ppm | Nd, ppm | Sm, ppm |
|---|---|---|---|---|---|---|
| Feedstock | 1727.0 | 594.0 | 46.9 | 137.6 | 82.7 | 39.1 |
| 35 min | 6.0 | 280.2 | 33.7 | 86.6 | 61.1 | 25.8 |

| Extraction Time | Gd, ppm | Yb, ppm | Th, ppm | U, ppm | Ti, ppm |
|---|---|---|---|---|---|
| Feedstock | 57.9 | 61.5 | 30.5 | 61.6 | 1128.0 |
| 35 min | 41.2 | 6.4 | 16.9 | <1.8 | >635.0 |

After overnight phase separation, the organic phase and the aqueous phase were separated. The aqueous phase was filtered with a filter press into filter cake and clear filtrate. ICP analysis showed that there was no detectable scandium left in the filtrate (<1 ppm). A sample of the filter cake was dried and calcined at an elevated temperature in air for the purposes of burning any residual organic solvent, particularly DEHPA that might chelate scandium. The high temperature-treated filtered cake was then digested with concentrated hydrochloric acid and ICP analysis showed that the calcined filtered cake contained 218.0 ppm scandium. A complete mass balance calculation derives an overall scandium extraction yield of about 97.4%.

However, the excessive mixing led to formation of a substantial layer of water-in-oil (or oil-in-water) emulsion with a volume of about 600-700 liters, which was transferred into a 250 gallon plastic tote. Into this plastic tote, about 3.5 gallons of ethanol was added in an open area. Then, a diaphragm pump was used to circulate this emulsion for about 30 minutes. Surprisingly, the emulsion completely broke down into three separate layers, about 100-200 liters of an aqueous greenish slurry at the bottom, about 100-150 liters of an opaque crud, and about 400-500 liters of a clear organic phase that contained scandium and other rare earth metals. The exhausted aqueous slurry was combined with the raffinate slurry for filtration to separate leaching residues and waste raffinate filtrate. A sample of this crud was filtered in the laboratory, which resulted in a filtrate that instantly separates into a clear organic phase and a clear aqueous phase. The organic phase was then combined with the product organic solution and the aqueous phase was combined with the raffinate filtrate that was pumped to the waste water treatment plant. The clear organic phase was also combined with the product organic phase for further purifications.

The combined organic phase, as a product organic stream, then underwent normal down-stream purification processing, such as impurity-scrubbing, product-stripping, and DEHPA regeneration for the purposes of recycling of the organic phase.

Example 2

In a 7000-liter FRP reactor, the aqueous acid-leached ore slurry was prepared in the same way as the Comparative Example and Example 1, with a slurry volume (about 3603 liters) similar to that of the Comparative Example. The slurry had a pH of about 0.5 and contained a concentration of 1427.0 ppm scandium. The slurry was mixed with 67 kg of hydroxylamine chloride which was slowly added into the slurry to reduce ferric ions ($Fe^{3+}$) into ferrous ions ($Fe^{2+}$) at 80-100° C. for one hour. The leached ore slurry changed from a reddish muddy color to a greenish color. Reduction of ferric ions by the hydroxylamine resulted in a decrease in the slurry pH due to the formation of an extra mole of hydrochloric acid for every mole of ferric ions that were reduced. Therefore, after the iron-reduced slurry was cooled to a temperature of about 65° C., the pH was adjusted back to 0.5 with a 20 wt. % sodium hydroxide solution.

While the mixer was off, 2200 liters of organic extractant solvent was pumped into the reactor by dropping from the top onto the surface of the iron-reduced acid-leached slurry. The fresh solvent contained about 20% DEHPA (di-2-ethylhexylphosphoric acid), 5% isodecanol, and 75% kerosene and floated on the top of the iron-reduced acid-leached slurry.

The mixer was re-started at a full speed, 147 rpm, at 60 hertz and ran for 4 minutes. The first sample (about 500 mL) was taken at the end of the first 4 minutes of mixing at 60 hertz while the mixer was still on. After a 5 minute stand-by, the mixer was turned on again for 4 more minutes. The second sample (about 500 mL) was taken at the end of the second 4 minutes of mixing at 60 hertz while the mixer was still on. With the same procedures, the mixer was turned on and off for a third and a fourth time. After phase separation in laboratory separatory funnels, ICP analysis found that the scandium concentrations in the raffinate slurries were 3.6 ppm, 1.9 ppm, 3.0 ppm, and 1.5 ppm, corresponding to first, second, third, and fourth samples, as shown in Table 2. It was calculated that the scandium extraction yield in the fourth sample was about 99.9%. The organic phase also contained other valuable rare earth metals.

TABLE 2

Results of the Analysis of the Raffinate Slurry from Example 2

| Extraction Time | Sc, ppm | Y, ppm | La, ppm | Ce, ppm | Nd, ppm | Sm, ppm |
|---|---|---|---|---|---|---|
| Feedstock | 1427.0 | 458.8 | 36.4 | 96.8 | 68.0 | 28.7 |
| 4 min | 3.6 | 358.4 | 31.1 | 84.4 | 57.9 | 23.8 |
| 8 min | 1.9 | 329.6 | 31.5 | 85.1 | 59.1 | 24.7 |
| 12 min | 3.0 | 272.7 | 31.2 | 84.2 | 58.1 | 24.6 |
| 16 min | 1.5 | 222.0 | 32.0 | 86.1 | 59.4 | 24.8 |

| Extraction Time | Gd, ppm | Yb, ppm | Th, ppm | U, ppm | Ti, ppm |
|---|---|---|---|---|---|
| Feedstock | 47.1 | 47.7 | 37.4 | 18.1 | 1288.0 |
| 4 min | 39.6 | 31.8 | 7.8 | 6.3 | >817.0 |
| 8 min | 40.3 | 21.8 | 3.7 | <2.3 | >800.0 |
| 12 min | 39.3 | 7.5 | 3.6 | <2.3 | >796.0 |
| 16 min | 40.1 | 3.4 | 3.8 | <2.3 | >778.0 |

After overnight phase separation, the organic phase and the aqueous phase were separated. The aqueous phase was filtered with a filter press into a filter cake and a clear filtrate. ICP analysis showed that there was no detectable scandium left in the filtrate (<1 ppm). A sample of the filter cake was dried and calcined at an elevated temperature in air for the purposes of burning off any residual organic solvent, particularly DEHPA that might chelate scandium. The high temperature-treated filter cake was then digested with concentrated hydrochloric acid and ICP analysis showed that the calcined filtered cake contained 69.0 ppm scandium. A complete mass balance calculation derives an overall scandium extraction yield of about 99.0%.

Surprisingly, such alternative on-and-off mixing led to a minimum level of formation of water-in-oil emulsion, or crud, with a volume of only about 50 liters, which is substantially less than the 600-700 liters of emulsion/crud that was generated in Example 1 due to the excessive mixing conditions. The crud from Example 2 was transferred into the 250 gallon plastic tote in Example 1.

The combined organic phase then underwent normal down-stream purification processing, such as impurity-scrubbing, product-stripping, and DEHPA regeneration for the purposes of recycling of the organic phase.

Example 3

In another 7000-liter FRP reactor that was identical to the 7000 liter FRP reactor that was used in Examples 1 and 2, the aqueous acid-leached ore slurry was leached in the same way as Comparative Example, with a slurry volume (about 3403 liters) similar to that of the Comparative Example. The slurry had a pH of about 0.5 and contained a concentration of 1201.0 ppm scandium. The slurry was mixed with 67 kg of hydroxylamine chloride which was slowly added into the slurry to reduce ferric ions ($Fe^{3+}$) into ferrous ions ($Fe^{2+}$) at 80-100° C. for one hour. The leached ore slurry changed from a reddish muddy color to a greenish color. Reduction of ferric ions by the hydroxylamine resulted in a decrease in the slurry pH due to the formation of an extra mole of hydrochloric acid for every mole of ferric ions that was reduced. Therefore, after the iron-reduced slurry was cooled to a temperature of about 65° C., the pH was adjusted back to 0.5 with a 20 wt. % sodium hydroxide solution.

While the mixer was off, about 2100 liters of organic extractant solvent was pumped into the reactor by dropping from the top onto the surface of the iron-reduced acid-leached slurry. The fresh solvent contained about 20% DEHPA (di-2-ethylhexylphosphoric acid), 5% isodecanol, and 75% kerosene and it floated on the top of the iron-reduced acid-leached slurry.

The mixing was re-started at a speed with the motor running at 60 hertz and ran for 4 minutes. The first sample (about 500 mL) was taken at the end of the first 4 minutes mixing at 60 hertz while the mixer was still on. After a 5 minute stand-by, the mixer was turned on again for 4 minutes a second time. The second sample (about 500 mL) was taken at the end of the second 4 minutes of mixing at 60 hertz while the mixer was still on. With the same procedures, the mixer was turned on and off for a third and a fourth time. After phase separation in laboratory separatory funnels, ICP analysis found that scandium concentrations in the raffinate slurries were 168.4 ppm, 209.1 ppm, 165.1 ppm, and 101.6 ppm, corresponding to the first, second, third, and fourth samples, as shown in Table 3. It was calculated that the scandium extraction yield in the fourth sample was 90.8%, lower than the yields from Examples 1 and 2.

TABLE 3

Results of the Analysis of the Raffinate Slurry from Example 3

| Extraction Time | Sc, ppm | Y, ppm | La, ppm | Ce, ppm | Nd, ppm | Sm, |
|---|---|---|---|---|---|---|
| Feedstock | 1201.0 | 381.8 | 30.3 | 80.9 | 56.3 | 24.2 |
| 4 min | 168.4 | 331.6 | 27.8 | 74.4 | 51.4 | 21.5 |
| 8 min | 209.1 | 324.8 | 26.9 | 72.1 | 50.4 | 20.9 |
| 12 min | 165.1 | 328.6 | 27.4 | 74.0 | 50.8 | 21.4 |
| 16 min | 101.6 | 327.8 | 28.0 | 74.2 | 51.6 | 21.6 |
| 16 min Raffinate + Fresh Organic | 1.4 | 12.8 | 27.5 | 73.6 | 49.9 | 19.1 |
| Plant Raffinate + Plant Organic | 2..0 | 23.0 | 28.1 | 75.1 | 51.9 | 20.3 |

TABLE 3-continued

Results of the Analysis of the Raffinate Slurry from Example 3

| Extraction Time | Gd, ppm | Yb, | Th, | U, ppm | Ti, ppm |
|---|---|---|---|---|---|
| Feedstock | 38.8 | 39.7 | 30.3 | 16.3 | 996.0 |
| 4 min | 36.1 | 32.5 | 12.7 | 4.9 | >782.0 |
| 8 min | 34.0 | 32.2 | 13.8 | 6.2 | >809.0 |
| 12 min | 34.6 | 32.0 | 12.9 | 4.8 | >783.0 |
| 16 min | 35.1 | 31.3 | 11.4 | 6.6 | >757.0 |
| Plant 16 min Raffinate + Fresh Organic | 25.9 | 0.2 | 1.7 | <2.3 | 420.9 |
| Plant Raffinate + Plant Organic | 29.8 | 0.3 | 2.2 | <2.3 | 441.0 |

The raffinate from the 16 minute extraction was shaken with fresh solvent, 100 mL raffinate and 60 mL extractive solvent, in a 500 mL separatory funnel for 5 minutes. After settling for about 5 to 30 minutes, the aqueous phase raffinate was separated from the organic phase by opening the bottom valve of the separatory funnel. It was found that this new raffinate contained only 1.4 ppm scandium, as shown in Table 3. It was speculated that the amount of aqueous acid-leached ore slurry in the reactor might not be sufficient to achieve the higher extraction efficiency like Examples 1 and 2 since this run only contained 3403 liters of leached ore slurry, as compared to 3803 liters for Example 1 and 3603 liters for Example 2. Therefore, about 400 liters of city water was added into the reactor and the extraction was performed according to procedures that were identical to those described in the immediately previous paragraph. It was found that the scandium concentrations in the raffinate slurries were 74.8 ppm, 77.5 ppm, 57.2 ppm, and 58.9 ppm, corresponding to the first, second, third, and fourth samples, as shown in Table 4. These new extraction results suggest that the aqueous level in the 700-liter reactor was not the reason that this run had lower extraction efficiency than Examples 1 and 2.

TABLE 4

Results of the Analysis of the Raffinate Slurry from Example 3 after Adding an Additional 400 Liters of City Water Followed by Additional Mixing

| Extraction Time | Sc, ppm | Y, ppm | La, ppm | Ce, ppm | Nd, ppm | Sm, ppm |
|---|---|---|---|---|---|---|
| Feedstock | 1427.0 | 458.8 | 36.4 | 96.8 | 68 | 28.7 |
| 4 min | 74.8 | 275.3 | 25.2 | 66.1 | 46.9 | 19.4 |
| 8 min | 77.5 | 290.4 | 25.3 | 66.8 | 47.7 | 19.5 |
| 12 min | 57.2 | 272.3 | 25.8 | 68.0 | 47.8 | 19.7 |
| 16 min | 58.9 | 287.6 | 25.3 | 67.0 | 47.7 | 19.8 |

| Extraction Time | Gd, ppm | Yb, ppm | Th, ppm | U, ppm | Ti, ppm |
|---|---|---|---|---|---|
| Feedstock | 47.1 | 47.7 | 37.4 | 18.1 | 1288.0 |
| 4 min | 31.0 | 24.2 | 9.4 | 6.1 | >732.0 |
| 8 min | 32.0 | 26.9 | 9.8 | 4.8 | ~642.0 |
| 12 min | 31.3 | 23.3 | 8.6 | 3.6 | 568.0 |
| 16 min | 31.8 | 26.0 | 9.2 | 2.9 | ~629.0 |

Then, the plant raffinate from the 16 minute extraction in Table 3 was re-mixed with the organic solvent resulting from the 16 minute extraction in Table 3 in a 500 mL separatory funnel and shaken for 5 minutes. After settling for about 5 to 30 minutes, the aqueous phase raffinate was separated from the organic phase by opening the bottom valve of the separatory funnel. The new raffinate slurry was analyzed by ICP, and it was surprisingly discovered that the new raffinate contained only 2.0 ppm of scandium, as shown in Table 3.

This suggested that there were no issues with the organic extractive solvent and aqueous acid-leaching ore slurry and that the lower extractive efficiency of scandium for this experiment came from other factors.

It was then discovered that the driving belt for the mixer in this FRP reactor was worn, so that the mixing speed at 60 hertz was only measured to be 92 rpm, about ⅔ of the mixing speed used in Examples 1 and 2. After the mixing belt was replaced, the mixing speed of the mixer of the reactor was measured to be 162 rpm. Extraction was then performed according to the procedures that are described in the previous two paragraphs and it was found from ICP analysis that scandium concentrations in the raffinate slurries were 7.9 ppm, 3.8 ppm, 6.7 ppm, and 3.1 ppm, corresponding to first, second, third, and fourth samples, respectively, as shown in Table 5. It was calculated that the scandium extraction yield in the fourth sample was 99.7%.

TABLE 5

Results of the Analysis of the Raffinate Slurry from Example 3 after Adding an Additional 400 Liters of City Water Followed by Additional Mixing after the Mixer Driving Belt Was Replaced

| Extraction Time | Sc, ppm | Y, ppm | La, ppm | Ce, ppm | Nd, ppm | Sm, ppm |
|---|---|---|---|---|---|---|
| Feedstock | 1427.0 | 458.8 | 36.4 | 96.8 | 68.0 | 28.7 |
| 4 min | 7.8 | 94.0 | 24.2 | 63.1 | 45.5 | 18.7 |
| 8 min | 3.8 | 64.0 | 25.0 | 66.3 | 46.5 | 18.8 |
| 12 min | 6.7 | 55.7 | 24.3 | 63.5 | 45.4 | 18.8 |
| 16 min | 3.1 | 48.7 | 24.7 | 65.6 | 46.4 | 18.8 |

| Extraction Time | Gd, ppm | Yb, ppm | Th, ppm | U, ppm | Ti, ppm |
|---|---|---|---|---|---|
| Feedstock | 47.1 | 47.7 | 37.4 | 18.1 | 1288.0 |
| 4 min | 28.5 | 1.0 | 3.1 | <1.8 | >1350.0 |
| 8 min | 28.9 | 0.7 | 2.7 | <1.8 | >589.0 |
| 12 min | 27.8 | 0.7 | 2.7 | <1.8 | >944.0 |
| 16 min | 28.6 | 0.5 | 2.2 | <1.8 | >590.0 |

After overnight phase separation, the organic phase and the aqueous phase was separated. The aqueous phase was filtered with a filter press into filter cake and clear filtrate. ICP analysis showed that there was no detectable scandium left in the filtrate (<1 ppm). A sample of the filter cake was dried and calcined at an elevated temperature in air for the purposes of burning off any residual organic solvent, particularly DEHPA that might chelate scandium ions. The high temperature-treated filtered cake was then digested with concentrated hydrochloric acid and ICP analysis showed that the calcined filtered cake contained 49.0 ppm scandium. A complete mass balance calculation derives an overall scandium extraction yield of about 99.0%.

This experiment further confirmed that the alternative on-and-off mixing method led to minimum formation of water-in-oil emulsion, or crud, with a volume of about 50 liters, substantially less that 600-700 liters of emulsion that was generated in Example 1 due to the excessive mixing conditions. The crud from Example 3 was also transferred into the 250 gallon plastic tote in Example 1 and Example 2, to bring the total volume to about 209 liters.

The crud from Examples 1, 2, and 3 in the 250 gallon plastic tote was then analyzed and found to contain 1788 ppm scandium. On a laboratory scale, it has been demonstrated that such crud that was treated with ethanol as described in example 1 can be filtered into filter cakes and filtrate. The filtrate forms two separate layers, a clear organic layer on the top and a clear aqueous layer at the bottom. The clear organic layer can then be combined into the product organic stream. The aqueous layer can be discharged to the waste water treatment plant. The filter cakes can be cycled back to the earlier stages of the process or returned to the leaching process again.

The combined organic phase then underwent normal down-stream purification processing, such as impurity-scrubbing, product-stripping, and DEHPA regeneration for the purposes of cycling of the organic phase.

By reviewing the results of Examples 1, 2 and 3, it was surprising that thorough or intense mixing is needed, as shown in Examples 2 and 3, to ensure good contact between the aqueous slurry and organic extractive solvent for achieving a high extractive efficiency of scandium. However, intense mixing for an excessive period of time, as exemplified in Example 1, creates conditions that form excessive emulsions and/or crud. Therefore, a short period of intensive mixing of the aqueous slurry and organic extractive solvent, step 1, followed by a period of settling, step 2, and optionally followed by a second set and/or multiple sets of repeating steps 1 and 2 results in a commercially viable extractive efficiency of scandium with a minimum level of emulsion and/or crud formation. The level of emulsions and crud formed during direct solvent extraction of scandium, or other rare earth metals, from aqueous acid-leaching ore slurries can also be successfully and economically handled by breaking the emulsions and/or crud by adding one or more alcohols to the emulsions and/or crud followed recirculation or some other type of mixing. Low-alcohol broken emulsions and crud can then be filtered for solid and liquid separation. The liquid phase is then instantly separated into a clear aqueous phase and a clear organic phase which contains the rare earth metals. The solid can then optionally be returned upstream for further recovery of valuable rare earth metals.

Examples 4-6: Direct Solvent Extraction of Scandium from an Aqueous Acid-Leached Ore Slurry in which Ferric Ions were not Reduced into Ferrous Ions A sample of about 500 mL of the aqueous acid-leached ore slurry of Example 1 was taken prior to the addition of 67 kg hydroxylamine to reduce the ferric ions ($Fe^{3+}$) into ferrous ions ($Fe^{2+}$). In the lab, 100 mL of the aqueous acid-leached ore slurry was mixed and shaken for 5 minutes with 60 mL organic extractive solvent. After settling for about 5 to 30 minutes, the aqueous phase raffinate was separated from the organic phase by opening the bottom valve of the separatory funnel. The raffinate slurry was analyzed by ICP, and, surprisingly, this raffinate contained only 14.7 ppm scandium, as shown in Table 6, which translated to a >99% scandium extraction efficiency.

TABLE 6

Results of the Analysis of the Raffinate Slurry from Examples 4-6

| Sample | Sc, ppm | Y, ppm | La, ppm | Ce, ppm | Nd, ppm | Sm, ppm |
|---|---|---|---|---|---|---|
| Example 4 Feedstock | >1425.0 | — | — | — | — | — |
| Example 4 Raffinate | 14.7 | — | — | — | — | — |
| Example 5 Feedstock | 1350.0 | 432.0 | 34.1 | 93.2 | 64.2 | 27.1 |
| Example 5 Raffinate | 9.5 | 427.7 | 34.6 | 92.2 | 64.3 | 27.3 |
| Example 6 Feedstock | 1283.0 | 409.4 | 32.8 | 86.7 | 61.1 | 25.8 |
| Example 6 Raffinate | 1.3 | 389.8 | 31.9 | 82.9 | 58.2 | 24.6 |

| Sample | Gd, ppm | Yb, ppm | Th, ppm | U, ppm | Ti, ppm |
|---|---|---|---|---|---|
| Example 4 Feedstock | — | — | — | — | — |
| Example 4 Raffinate | — | — | — | — | — |
| Example 5 Feedstock | 44.1 | 45.3 | 37.0 | 14.7 | >1274.0 |
| Example 5 Raffinate | 43.4 | 40.2 | 27.9 | <2.3 | >1063.0 |
| Example 6 Feedstock | 41.5 | 42.6 | 29.1 | 13.4 | 1023.0 |
| Example 6 Raffinate | 39.0 | 36.0 | 19.8 | <2.3 | 417.1 |

Example 5

The procedure that was used in Example 4 was then repeated using the of the aqueous acid-leached slurry of Example 2 taken prior to the addition of 67 kg hydroxylamine to reduce the ferric ions ($Fe^{3+}$) into ferrous ions ($Fe^{2+}$). The raffinate slurry was analyzed by ICP and found to contain only 9.5 ppm scandium, as shown in Table 6, which translates to a 99.3% scandium extraction efficiency.

Example 6

The procedure that was used in Example 4 was then repeated using the of the aqueous acid-leached slurry of Example 3 taken prior to the addition of 67 kg hydroxylamine to reduce the ferric ions ($Fe^{3+}$) into ferrous ions ($Fe^{2+}$). The raffinate slurry was analyzed by ICP, was found to contain only 1.3 ppm scandium, as shown in Table 6, which translates to a 99.9% scandium extraction efficiency.

The data in Table 6 shows the amount of rare earth metal(s) extracted by the solvent for slurries where the ferric ions are reduced to ferrous ions is not significantly different from the amount of rare earth metal(s) extracted by the solvent for slurries where the ferric ions are not reduced to ferrous ions. This is particularly true with respect to scandium.

By reviewing the results of Examples 4, 5 and 6, it shows that, surprisingly, scandium was successfully recovered from aqueous acid-leached ore slurries in which ferric ions were not reduced to ferrous ions. Direct solvent extraction of rare earth metals from acid-leached ore slurries without the need to reduce ferric ions to ferrous ions offers enormous economic advantages in extracting rare earth metals from red mud and other types of feedstock containing very low concentrations of rare earth metals, as low as 100 ppm or less Examples 7 to 12: pH Effect on Direct Solvent Extraction of Rare Earth Metals from Aqueous Acid-Leached Ore Slurries in which Ferric Ions were Reduced to Ferrous Ions In an acid leaching plant, about two to three gallons of acid-leaching slurry was taken from a 7000-liter FRP reactor, a typical acid leaching batch having a pH of 0.5 that runs identically to the Comparative Example. This aqueous acid-leaching ore slurry, 1868 grams, has a solid content of 20.45%, which was determined by filtering and washing the filter cakes, followed by oven drying at 110° C. The slurry was heated up to a temperature between 80 and 100° C., 43 grams of hydroxylamine chloride was slowly added, in about 40 minutes, the temperature was maintained between 80 to 100° C. for another hour. The pH of the slurry dropped below zero, −0.5. The slurry was then cooled to room temperature. 5 mL of this slurry was digested with concentrated HCl and analyzed with standard ICP. The analytical results are tabulated in Table 7. Such hydroxylamine chloride-reduced acid-leached ore slurry was used in Examples 7 to 10 for demonstrating the effects of pH on the extraction efficiency of different rare earth metals.

TABLE 7

Effect of pH of an Aqueous Acid-Leached Ore Slurries in which Ferric Ions Were Reduced to Ferrous Ions on the Extraction of Rare Earth Metals

| Examples | Acid-Dig. Slurry-Residue & Solvent | Amount | Sc ppm | Efficiency % | Na ppm | Mg ppm | Si ppm | Ca ppm | Ti ppm |
|---|---|---|---|---|---|---|---|---|---|
| Feedstock | Reduced Acid-Leaching-Slurry prior to Extraction | — | 974.0 | | >41252 | >3634 | 153.2 | >10074 | 606.0 |
| Example 7 | Extract Raffinate @ pH 0.0 | 100 mL | 1.6 | 99.8 | >103820 | >3190 | 217.0 | >9023 | 112.9 |
| | Organic Residue @pH 0.0 | 0.6 | 54.1 | | >2611 | 2066.1 | 705.2 | 5970.0 | 300.4 |
| | Solvent @ pH 0.0 | 50 mL | 1366.0 | | | | | | 961.0 |
| Example 8 | Extract Raffinate @ pH 1.0 | 150 mL | 7.6 | 99.2 | >45042 | >3349 | 185.5 | >9419 | 316.4 |
| | Organic Residue @pH 1.0 | 0.6 | 2.1 | | >9881 | >861 | 105.8 | >2461 | 101.3 |
| | Solvent @ pH 1.0 | 75 mL | 1711.0 | | | | | | |
| Example 9 | Extract Raffinate @ pH 2.0 | 100 mL | 3.2 | 99.7 | >43201 | >3144 | 187.2 | >8879 | 282.1 |
| | Organic Residue @pH 2.0 | 0.2 | 0.5 | | >2782 | 197.4 | 73.2 | 593.0 | 31.2 |
| | Solvent @ pH 2.0 | 50 mL | 1594.0 | | | | | | |
| Example 10 | Extract Raffinate @ pH 3.0 | 100 mL | 13.2 | 98.6 | >45950 | >3151 | 152.3 | >8883 | 314.9 |
| | Organic Residue @pH 3.0 | 0.2 | 0.3 | | >2255 | 156.1 | 36.3 | 517.0 | 3.7 |
| | Solvent @ pH 3.0 | 50 mL | 1600 | | | | | | |

| Examples | Acid-Dig. Slurry-Residue & Solvent. | Y ppm | Ce ppm | Nd ppm | Sm ppm | Gd ppm | Yb ppm | Th ppm | U ppm |
|---|---|---|---|---|---|---|---|---|---|
| Feedstock | Reduced Acid-Leaching-Slurry prior to Extraction | 287.7 | 58.7 | 40.4 | 17.7 | 29.3 | 32.0 | 22.9 | 13.3 |
| Example 7 | Extract Raffinate @ pH 0.0 | 215.2 | 47.7 | 36.1 | 15.6 | 25.3 | 13.73 | 4.81 | 14.8 |
| | Organic Residue @pH 0.0 | 185.1 | 37.6 | 23.1 | 11.8 | 14.3 | 37.1 | 45.3 | <2.3 |
| | Solvent @ pH 0.0 | 97.0 | | | | | 27.0 | 16.0 | 21.0 |
| Example 8 | Extract Raffinate @ pH 1.0 | 195.3 | 53.1 | 36.0 | 15.7 | 25.2 | 12.2 | 8.9 | <2.3 |
| | Organic Residue @pH 1.0 | 18.4 | 17.8 | 10.1 | 5.2 | 7.96 | 1.0 | 16.1 | <2.3 |
| | Solvent @ pH 0 | 193.0 | | | | | 28.0 | 20.0 | 30.0 |
| Example 9 | Extract Raffinate @ pH 2.0 | 4.6 | 48.5 | 31.6 | 10.5 | 11.6 | 0.1 | 10.6 | <2.3 |
| | Organic Residue @pH 2.0 | 17.7 | 9.2 | 6.9 | 6.2 | 7.6 | 1.6 | 6.2 | <2.3 |
| | Solvent @ pH 2.0 | 551.0 | | | | | 47.0 | 14.0 | 27.0 |
| Example 10 | Extract Raffinate @ pH 3.0 | 0.9 | 24.1 | 12.5 | 2.0 | 3.9 | 0.1 | 10.4 | <2.3 |
| | Organic Residue @pH 3.0 | 84.9 | 35.5 | 25.3 | 10.3 | 12.6 | 7.5 | 2.7 | <2.3 |
| | Solvent @ pH 3.0 | 521.0 | | | | | 36.0 | 13.0 | 26.0 |

Example 7

The pH for 100 mL of the hydroxylamine chloride-reduced acid-leaching slurry was adjusted using a 20% NaOH solution to a pH of about 0.0. Then this 100 mL of slurry at a pH of 0.0 was transferred into a 500 mL separatory funnel with 50 mL of organic extractive solvent and shaken for 5 minutes. After settling for about 5 to 30 minutes, the aqueous phase raffinate was separated from the organic phase by opening the bottom valve of the separatory funnel, then the raffinate slurry was analyzed by ICP. The results show that the raffinate slurry contained 1.6 ppm scandium, as shown in Table 7, which translates to a 99.8% scandium extraction efficiency. In addition, the extraction efficiency for other rare earth metals was as follows: yttrium about 25%, cerium about 19%, neodymium about 11%, samarium about 12%, gadolinium about 13%, and ytterbium about 57%. In the organic phase, the solvent contained mainly scandium (1366.0 ppm), titanium (961.0 ppm), iron (682.0 ppm), and some other rare earth metals (between 27.0 to 97.0 ppm).

Example 8

The pH for 150 mL of the hydroxylamine chloride-reduced acid-leached slurry was adjusted using a 20% NaOH solution to a pH of about 1.0. Then this 150 mL of slurry at a pH of 1.0 was transferred into a 500 mL separatory funnel with 75 mL of organic extractive solvent and shaken for 5 minutes. After settling for about 5 to 30 minutes, the aqueous phase raffinate was separated from the organic phase by opening the bottom valve of the separatory funnel, then the raffinate slurry was analyzed by ICP. The results show that the raffinate slurry contained 7.6 ppm scandium, as shown in Table 7, which translates to a 99.2% scandium extraction efficiency. In addition, for other rare earth metals, the extraction efficiency was about at the same level for those from pH 0.0 slurry: yttrium about 32%, cerium about 10%, neodymium about 11%, samarium about 11%, gadolinium about 14%, and ytterbium about 62%. In the organic phase, the solvent contained mainly scandium (1711.0 ppm), a reduced amount of iron (104.0 ppm), and an increased amount of other rare, earth metals (between 28.0 to 193.0 ppm).

Example 9

The pH for 100 mL of the hydroxylamine chloride-reduced acid-leached slurry was adjusted using a 20% NaOH solution to a pH of about 2.0. Then this 100 mL slurry at a pH of 2.0 was transferred into a 500 mL separatory funnel with 50 mL of organic extractive solvent and shaken for 5 minutes. After settling for about 5 to 30 minutes, the aqueous phase raffinate was separated from the organic phase by opening the bottom valve of the separatory funnel, then the raffinate slurry was analyzed by ICP. The results show that the raffinate slurry contained 3.2 ppm scandium, as shown in Table 7, which translates to a 99.7% scandium extraction efficiency. In addition, for other rare earth metals, the extraction efficiency increased substantially, as compared to those from the pH 0.0 slurry: yttrium about 98%, cerium about 17%, neodymium about 22%, samarium about 40%, gadolinium about 60%, and ytterbium about 100%. In the organic phase, the solvent contained mainly scandium (1594.0 ppm), a reduced amount of iron (162.0 ppm), and an increased amount of other rare earth metals (between 47.0 to 551.0 ppm).

Example 10

The pH for 100 mL of the hydroxylamine chloride-reduced acid-leached slurry was adjusted using a 20% NaOH solution to a pH of about 3.0. Then this 100 mL slurry at a pH of 3.0 was transferred into a 500 mL separatory funnel with 50 mL of organic extractive solvent and shaken for 5 minutes. After settling for about 5 to 30 minutes, the aqueous phase raffinate was separated from the organic phase by opening the bottom valve of the separatory funnel, then the raffinate slurry was analyzed by ICP. The results show that the raffinate slurry contained 13.2 ppm scandium, as shown in Table 7, which translates to a 98.6% scandium extraction efficiency. In addition, for other rare earth metals, the extraction efficiency increased substantially, as compared to those from the pH 0.0 slurry: yttrium about 100%, cerium about 59%, neodymium about 69%, samarium about 89%, gadolinium about 87%, and ytterbium about 100%. In the organic phase, the solvent contained mainly scandium (1600.0 ppm), a reduced amount of iron (116.0 ppm), and an increased amount of other rare earth metals (between 36.0 to 521.0 ppm).

Example 11

The pH for 100 mL of the hydroxylamine chloride-reduced acid-leached slurry was adjusted using a 20% NaOH solution to a pH of about 4.0. Then this 100 mL slurry of at a pH of 4.0 was transferred into a 500 mL separatory funnel with 50 mL of organic extractive solvent and shaken for 5 minutes. After settling for about 5 to 30 minutes, it was observed that most of the inorganic particles in the aqueous slurry phase were transferred into the organic phase to form a crud, therefore, the direct solvent extraction of rare earth metals could not be successfully carried out for the aqueous slurry having a pH of 4.0.

The above-described process completely eliminates the conventional process involving filtration and washing, an intermediate process step, by direct solvent extraction of a rare earth metal and/or multiple rare earth metals from acid-leached ore slurries. This avoids solvent extraction of the rare earth metals from a large volume of washed aqueous solutions containing low concentrations of rare earth metals, saves a large volume of fresh water that would be used for extended washing, and reduces the volume of waste raffinate that must be processed and discharged. Even though washing the filter cakes with an unlimited amount of fresh water might allow a complete recovery of all soluble rare earth metals in the prior art process, industrial practices limit the amount of fresh water used for economic reasons. Therefore, there is always a loss of rare earth metals that can be potentially completely recovered. With direct solvent extraction of rare earth metals from the acid-leached ore slurries, as demonstrated by the examples above, rare earth metals can be recovered with a yield that is 50% or greater and in the case of certain rare earth metals, scandium for example, can be 90% or greater.

In the event that partial amounts of rare earth metal ions are chemically bonded to ion-exchangeable sites of the inorganic residues and not available for recovery by a simple washing process, direct solvent extraction of rare earth metals from the acid-leached ore slurries, substantially improves the yields and, under ideal conditions, achieves close to complete extraction as demonstrated by the examples. Recovery is accomplished by using thermodynamically favored chelating chemistry to strip the rare earth metal ions from the ion-exchangeable bonding sites on the leached residue particles Also short-chain alcohols, such as isopropanol or ethanol, can be used to break emulsions and/or crud that may form during direct extraction.

In addition, the inventive method allows for, the recovery of rare earth metals from feedstock (such as red mud) without the need for reducing ferric ions to ferrous ions, which adds expense to the process.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method of extracting scandium from ore comprising:
   providing an aqueous acid-leached ore slurry comprising scandium and at least 0.1% solids; and
   extracting the scandium from the aqueous acid-leached ore slurry, wherein the extraction of the scandium from the aqueous acid-leached ore slurry comprises:
      adding an organic extractive solvent to the aqueous acid-leached ore slurry;
      mixing the organic extractive solvent with the aqueous acid-leached ore slurry to form a mixture; and
      separating the mixture into at least an aqueous phase and a solvent phase, wherein the solvent phase comprises the extracted scandium.

2. The method of claim 1, wherein the aqueous acid-leached ore slurry has a viscosity of less than 400 centipoise.

3. The method of claim 1, wherein the aqueous acid-leached ore slurry has a viscosity of less than 100 centipoise.

4. The method of claim 1, wherein the aqueous acid-leached ore slurry has a Newtonian or near Newtonian rheology.

5. The method of claim 1, wherein the aqueous acid-leached ore slurry has a pH of less than 4.0.

6. The method of claim 1, wherein the aqueous acid-leached ore slurry is treated to convert ferric iron ions to ferrous iron ions prior to adding the organic extractive solvent.

7. The method of claim 1, wherein the organic extractive solvent comprises an extractant, a solvent, and a modifier.

8. The method of claim 7, wherein the extractant is anionic or non-ionic.

9. The method of claim 7, wherein the extractant comprises phosphorous-containing molecules.

10. The method of claim 7, wherein the extractant is Di-(2-ethylhexyl)-phosphoric acid or tri-butyl phosphate.

11. The method of claim 7, wherein the solvent comprises a hydrocarbon or mixture of hydrocarbons having a boiling point of 100° C. or greater.

12. The method of claim 7, wherein the solvent is kerosene or diesel.

13. The method of claim 7, wherein the modifier is isodecanol, coconut alcohol, octanol, ethylhexyl alcohol, or any other alcohol containing six or more carbon atoms.

14. The method of claim 1, wherein the mixing comprises completing a mixing-resting cycle comprising mixing for at least 3 seconds followed by turning off the mixing to allow the mixture to rest for at least two seconds and, optionally repeating the mixing-resting cycle two or more times.

15. The method of claim 1, wherein the mixing is carried out at less than or equal to 100° C.

16. The method of claim 1, wherein the mixing is carried out at a temperature less than the boiling point of the organic extractive solvent.

17. The method of claim 1, wherein separation of the mixture results in an emulsion phase, crud, or both in addition to the aqueous phase and the solvent phase and the emulsion phase, the crud, or both are further treated by:
   adding a low-carbon-number alcohol to the emulsion phase, the crud, or both;
   mixing the alcohol with the emulsion phase, the crud, or both to form a mixture;
   separating the mixture into an organic liquid fraction, an aqueous slurry fraction, and an aqueous-organic-particle slurry fraction;
   optionally, separating the aqueous-organic-particle slurry fraction into a liquid fraction and filter cakes by filtration or centrifugation; and
   optionally, adding the aqueous phase to the aqueous phase that resulted from the separation of the organic extractive solvent/aqueous acid-leached ore slurry mixture and adding the solvent phase to the solvent phase that resulted from the separation of the organic extractive solvent/aqueous acid-leached ore slurry mixture.

18. A method of treating emulsion, crud, or a combination thereof formed during extraction of rare earth metals from ore or from a clear solution containing rare earth metals to recover rare earth metals contained in the emulsion, crud, or a combination thereof:
   adding a low-carbon-number alcohol to the emulsion, the crud, or the combination thereof;
   mixing the alcohol with the emulsion, the crud, or the combination thereof to form a mixture; and
   separating the mixture into an organic liquid fraction, an aqueous slurry fraction, and an aqueous-organic-particle slurry fraction.

19. The method of claim 18, further comprising separating the aqueous-organic-particle slurry fraction into a liquid fraction and filter cake by filtration or centrifuge.

20. The method of claim 18, wherein the low-carbon-number alcohol comprises methanol, ethanol, n-propanol and isopropyl alcohol, n-butanol and its isomers, n-pentanol and its isomers, n-hexanol and its isomers, heptanol and its isomers, octanol and its isomers, nonanol and its isomers, or mixtures thereof.

* * * * *